United States Patent
Fong et al.

(10) Patent No.: US 9,080,545 B2
(45) Date of Patent: Jul. 14, 2015

(54) ALTERNATING IGNITION ANGLE BEFORE TDC

(75) Inventors: Carl-Johan Fong, Gränna (SE); Reine Gustafsson, Jönköping (SE)

(73) Assignee: HUSQVARNA AB, Huskvarna (SE)

( * ) Notice: Subject to any disclaimer, the term of this patent is extended or adjusted under 35 U.S.C. 154(b) by 415 days.

(21) Appl. No.: 13/576,696

(22) PCT Filed: Feb. 2, 2010

(86) PCT No.: PCT/SE2010/050109
§ 371 (c)(1),
(2), (4) Date: Aug. 2, 2012

(87) PCT Pub. No.: WO2011/096852
PCT Pub. Date: Aug. 11, 2011

(65) Prior Publication Data
US 2012/0304966 A1 Dec. 6, 2012

(51) Int. Cl.
*F02P 5/00* (2006.01)
*F02P 5/15* (2006.01)
*F02P 9/00* (2006.01)

(52) U.S. Cl.
CPC ............... *F02P 5/1502* (2013.01); *F02P 9/005* (2013.01); *F02D 2400/04* (2013.01); *Y02T 10/46* (2013.01)

(58) Field of Classification Search
CPC .................................. F02P 5/00; F02D 37/02
USPC ............. 123/406.11, 406.18, 406.23, 406.24, 123/406.26
See application file for complete search history.

(56) References Cited

U.S. PATENT DOCUMENTS

| | | | |
|---|---|---|---|
| 4,075,989 A | 2/1978 | Nagasawa | |
| 4,244,336 A | 1/1981 | Fitzner | |
| 4,572,150 A | 2/1986 | Foster | |
| 6,868,829 B1 | 3/2005 | Geyer et al. | |
| 7,320,306 B2 | 1/2008 | Tamamoto et al. | |
| 2001/0045204 A1* | 11/2001 | Shidara et al. | 123/406.59 |
| 2006/0065236 A1* | 3/2006 | Andersson et al. | 123/335 |
| 2006/0287796 A1 | 12/2006 | Matsuda et al. | |
| 2007/0078040 A1* | 4/2007 | Nobumoto et al. | 477/70 |

(Continued)

FOREIGN PATENT DOCUMENTS

| | | |
|---|---|---|
| CN | 1886592 A | 12/2006 |
| CN | 1924345 A | 3/2007 |

(Continued)

OTHER PUBLICATIONS

International Search Report and Written Opinion of PCT/SE2010/050109 mailed Oct. 12, 2010.

(Continued)

*Primary Examiner* — John Kwon
(74) *Attorney, Agent, or Firm* — Nelson Mullins Riley & Scarborough LLP

(57) ABSTRACT

The invention relates to methods and means of regulating the speed of a two-stroke combustion engine. An arrangement for alternating an ignition timing relative to a top dead center position is provided. For a given engine speed, the ignition timing may be step-wise adjustable. One or more steps may be used while alternating between two ignition timings. The ignition timing may be adjusted when the engine speed increases above a threshold engine speed.

17 Claims, 3 Drawing Sheets

(56) References Cited

U.S. PATENT DOCUMENTS

| | | |
|---|---|---|
| 2007/0125341 A1 | 6/2007 | Tamamoto et al. |
| 2008/0163851 A1 | 7/2008 | Kolossow |
| 2009/0101105 A1 | 4/2009 | Tamamoto |

FOREIGN PATENT DOCUMENTS

| | | |
|---|---|---|
| CN | 101029616 A | 9/2007 |
| CN | 101548094 A | 9/2009 |
| EP | 1691070 A1 | 8/2006 |
| JP | S54158925 U | 4/1953 |
| JP | S55019981 A | 2/1980 |
| JP | H05050077 U | 7/1993 |
| JP | H08086233 A | 4/1996 |
| JP | 2005163616 A | 6/2005 |
| JP | 2007046495 A | 2/2007 |

OTHER PUBLICATIONS

Chapter II International Preliminary Report on Patentability of PCT/SE2010/050109 mailed May 3, 2012.

* cited by examiner

ALTERNATING IGNITION ANGLE BEFORE TDC

TECHNICAL FIELD

The present invention relates to a means for operating a two-stroke combustion engine. More particularly, it relates to a method and an arrangement for controlling the speed of the two-stroke combustion engine.

BACKGROUND

Two-stroke combustion engines are extensively used in a variety of handheld tools such as, but not limited to, chainsaws, hedge trimmers, grass trimmers, blowers and mowers. When a two-stroke combustion engine is subjected to a very small load during operation, the engine speed may reach a very high value. This results in premature wear and failure of the engine. Hence, there is a requirement to regulate the engine speed in order to avoid any damage to the engine.

Typically, ignition timing of the engine relative to a top dead center (TDC) position is adjusted to regulate the engine speed. It is well known in the art, in case the engine speed reaches a predetermined threshold engine speed, the engine speed is regulated by gradually and continuously retarding the ignition timing relative to the TDC position. The ignition timing relative to the TDC refers to an angular position of the crankshaft in terms of the number of degrees before the TDC position at which a spark ignites the air-fuel mixture in a cylinder during compression stroke. However, by decreasing the ignition timing to very close to the TDC, blow out of unburned fuel in the exhaust muffler may occur. This results in a loss of power output, increased pollutants in the exhaust gases and unwanted noise. Moreover, the temperature of the exhaust gases is very high and this may also leads to unintended glow ignition.

Further, the ignition timing is also dependent on the engine temperature; in case of a cold engine decreasing the ignition timing to very close to the TDC results in incomplete combustion and increases pollutants in the exhaust gases.

In some cases, along with the control of the ignition timing, cut-out is employed to regulate the engine speed. During cut-out, ignition is skipped for some revolutions of the crankshaft. This helps in regulating the engine speed and also decreases the temperature of the exhaust gases. However, it has the disadvantage of blowing out unburned gases during the engine revolutions for which ignition is skipped and results in an increased amount of pollutants in the exhaust gases. Further, cut-out also affects the operation due to an uneven power output by the engine.

In light of the foregoing, there is a need for an improved system and method for regulating the speed of a two-stroke combustion engine. Moreover, there is a need for a means for regulating the engine speed to provide improved engine performance and efficiency.

SUMMARY

In view of the above, it is an objective to solve or at least reduce the problems discussed above. In particular, an objective is to provide methods and means for regulating the speed of a two-stroke combustion engine to avoid any damage to the engine.

The objective is achieved with a novel arrangement according to claim 1, in which the arrangement includes a means for alternating the ignition timing of a two-stroke combustion engine. The means for alternating the ignition timing is provided to adjust the ignition timing in a step-wise mode in response to engine speed. Thus, the arrangement is able to control the engine speed during low load conditions. The means is utilized to alternate the ignition timing in a non-continuous manner for high engine speeds and controls any further increase in the engine speed. Further, according to an embodiment of the invention, the means alternates the ignition timing in case the engine speed is higher than a threshold engine speed.

According another embodiment of the invention, the means for alternating the ignition timing is provided to control the ignition timing such that the ignition timing is step-wise adjustable in one or more alternating spans. However, according to claim 4, the ignition timing such that the ignition timing is step-wise adjustable in an alternating span between a first ignition timing and a second ignition timing. According to a particular embodiment of the invention, in case of a cold engine, the means for alternating the ignition timing is arranged to alternate the ignition timing between about 31 degrees before the top dead center (TDC) position and about 10 degrees before the TDC position. Further, in case of a warm engine, the means alternates the ignition timing between about 10 degrees before the TDC position and about 0 degree before the TDC position.

According to yet another embodiment, the engine operates in a speed range of 0 RPM to 15000 RPM, and the threshold engine speed is set to 8000 RPM. Thus, the ignition timing is step-wise adjustable to control the engine speed beyond 8000 RPM.

According to claims 9 and 10, in addition to alternating the ignition timing, for one or more crankshaft revolutions ignition may be skipped and/or the engine may operate at the same ignition timing for two or more crankshaft revolutions.

According to a second aspect of the invention, a method is provided for operating the engine. The method may include the steps of obtaining the engine speed and alternating the ignition timing relative to a top dead center position responsive to the obtained engine speed. Subsequently, the ignition timing is step-wise adjusted as the engine speed increases above the threshold engine speed.

According to an embodiment of the second aspect of the invention, the method may include alternating the ignition timing between one or more alternating spans. Further, according to other embodiments of the second aspect of the invention, the method may include alternating the ignition timing between the first ignition timing and the second ignition timing, for example between 31 degrees to 10 degrees for the cold engine and between 10 degrees to 0 degree for the warm engine.

According to claim 17 other embodiments of the second aspect of the invention, the method further includes operating the engine in the range of 0 RPM to 15000 RPM and skipping the ignition for one or more revolutions and/or operating the engine at same ignition timing for two or more revolutions.

BRIEF DESCRIPTION OF THE DRAWINGS

The invention will in the following be described in more detail with reference to the enclosed drawings, wherein.

DESCRIPTION OF EMBODIMENTS

Figure 1:
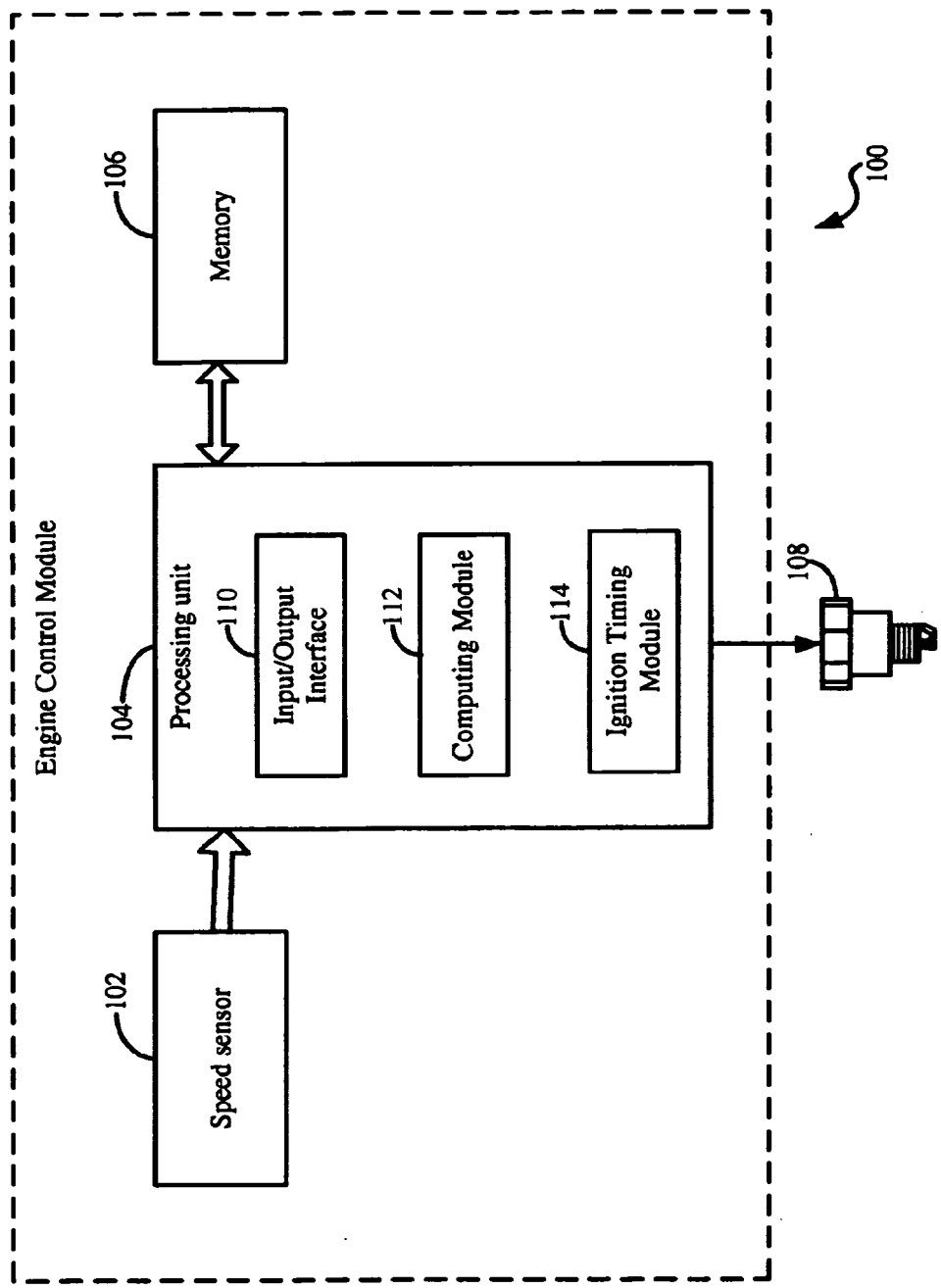
FIG. 1 is a block diagram which illustrates a control unit for regulating engine speed of a two-stroke combustion engine, according to an embodiment of the present invention.

The present invention will be described more fully hereinafter with reference to the accompanying drawings, in which preferred embodiments of the invention are shown. This invention may, however, be embodied in many different forms herein; rather, these embodiments are provided so that this disclosure will be thorough and complete, and will fully convey the scope of the invention to those skilled in the art. In the drawings, like numbers refer to like references.

FIG. 1 is a block diagram which illustrates a control unit 100 for regulating the engine speed of a two-stroke combustion engine (not shown), according to an embodiment of the present invention. The two-stroke combustion engine (hereinafter referred to as the "engine") may be used in a handheld power tools such as for example, chainsaws, trimmers, blowers, mowers and other garden or forestry equipment. However, the engine may also be used in any another applications without departing from the essence of the present invention.

In an embodiment of the present invention the control unit 100 may be an electronic ignition system associated with an engine control module (ECM) of the engine. The ECM may also include a fuel injection control unit, a valve timing control unit, an idle speed control unit and other control units for controlling the various parameters of the engine. Further, the ECM may utilize various sensor devices, for example but not limited to, a throttle opening sensor, a crankshaft position sensor and temperature sensors. In an embodiment of the present invention, the control unit 100 regulates the engine speed by retarding the ignition timing relative to a top dead centre (TDC) position in a non-continuous relationship with the engine speed. The ignition timing relative to the TDC refers to an angular position of the crankshaft in terms of the number of degrees before the TDC position at which a spark ignites an air-fuel mixture. In another embodiment of the present invention, the control unit 100 may regulate the engine speed by alternating the ignition timing relative to the TDC position.

As illustrated in FIG. 1, the control unit 100 includes a speed sensor 102, a processing unit 104 and a memory means 106. During operation, the speed sensor 102 measures the engine speed. The engine speed obtained by the speed sensor 102 may be provided to the processing unit 104. The processing unit 104 may compare the engine speed with a threshold engine speed. The threshold engine speed data for the engine may be stored in the memory means 106. In case the ignition timing exceeds the threshold engine speed, the ignition timing of the engine is arranged to alternate in a step-wise manner for a given engine speed. Further, the control unit 100 may be connected to a spark plug 108 to ignite the air-fuel mixture during a compression stroke.

In an embodiment of the present invention, the control unit 100 may control the ignition timing in one or more alternating spans. In an alternating span, the ignition timing may be step-wise adjusted between a first ignition timing and a second ignition timing. By retarding the ignition timing in this non-continuous step-wise mode, a better control over the engine speed is achieved. In another embodiment of the present invention, in addition to alternating the ignition timing, the ignition may be skipped for a few revolutions of the crankshaft to regulate the engine speed. In yet another embodiment of the present invention, the engine may operate at the first ignition timing for some revolutions and at the second ignition timing for other revolutions of the crankshaft.

In an embodiment of the present invention, the memory means 106 may be a Random Access Memory (RAM), Read Only Memory (ROM), flash memory or any suitable storage equipment. The memory means 106 may includes various modules for storing operating instructions and other software of the control unit 100. The operating instructions may be a set of computer executable instructions for controlling the overall operations of the control unit 100.

The memory means 106 may also store a database of parameters required to determine the ignition timing relative to the TDC position for a given engine speed. The parameters may include an ignition timing map with engine speed and operating conditions of the engine, operating load etc. Operating conditions may include the power output and loading conditions of the engine. In an embodiment of the present invention, the memory means 106 may store the data representing step-wise relationship between the ignition timing before TDC position and the engine speed. The ignition timings may either be computed on a real time basis or may be computed off-line. One or more parameters from the memory means 106 may be communicated to the processing unit 104.

The processing unit 104 performs all the computations required for regulating the engine speed. The processing unit 104 may include an input/output (I/O) interface 110. The I/O interface 110 may be operable for getting parameters and computer executable instructions stored in the memory means 106. In an embodiment of the present invention, the processing unit 104 may obtain the engine speed from the speed sensor 102 through the I/O interface 110.

The processing unit 104 may also include a computing module 112 for the computation of the parameters relevant for determining the ignition timing. In an embodiment of the present invention, the parameters may be the operating conditions of the engine. In an alternate embodiment of the present invention, the computing module 112 may further determine additional parameters, such as but not limited to, temperature of the engine and the number of revolutions for which the ignition will be skipped.

An ignition timing module 114 may be included in the processing unit 104. Based on the parameters computed in the computing module 112, the ignition timing module 114 determines the ignition timing relative to the TDC position. In an embodiment of the present invention, the ignition timing is determined based on the engine speed. In another embodiment of the present invention, the ignition timing module 114 may also utilize additional parameters, such as but not limited to, temperature of the engine, number of revolutions for which the ignition will be skipped, and operating history of the engine to determine the ignition timing relative to the TDC position.

The processing unit 104 may send an output signal to the spark plug 108 for setting the determined ignition timing. In an embodiment of the present invention, the signal may indicate an alternating span for step-wise adjustment of the ignition timing and regulating of the engine speed. In another embodiment of the present invention, the processing unit 104 may send the output signal when the engine speed is higher than the threshold engine speed. In various other embodiments of the present invention, the signal may indicate a number of revolutions for which the ignition needs to be skipped and/or may include one or more alternating spans of ignition timing.

Figure 2:
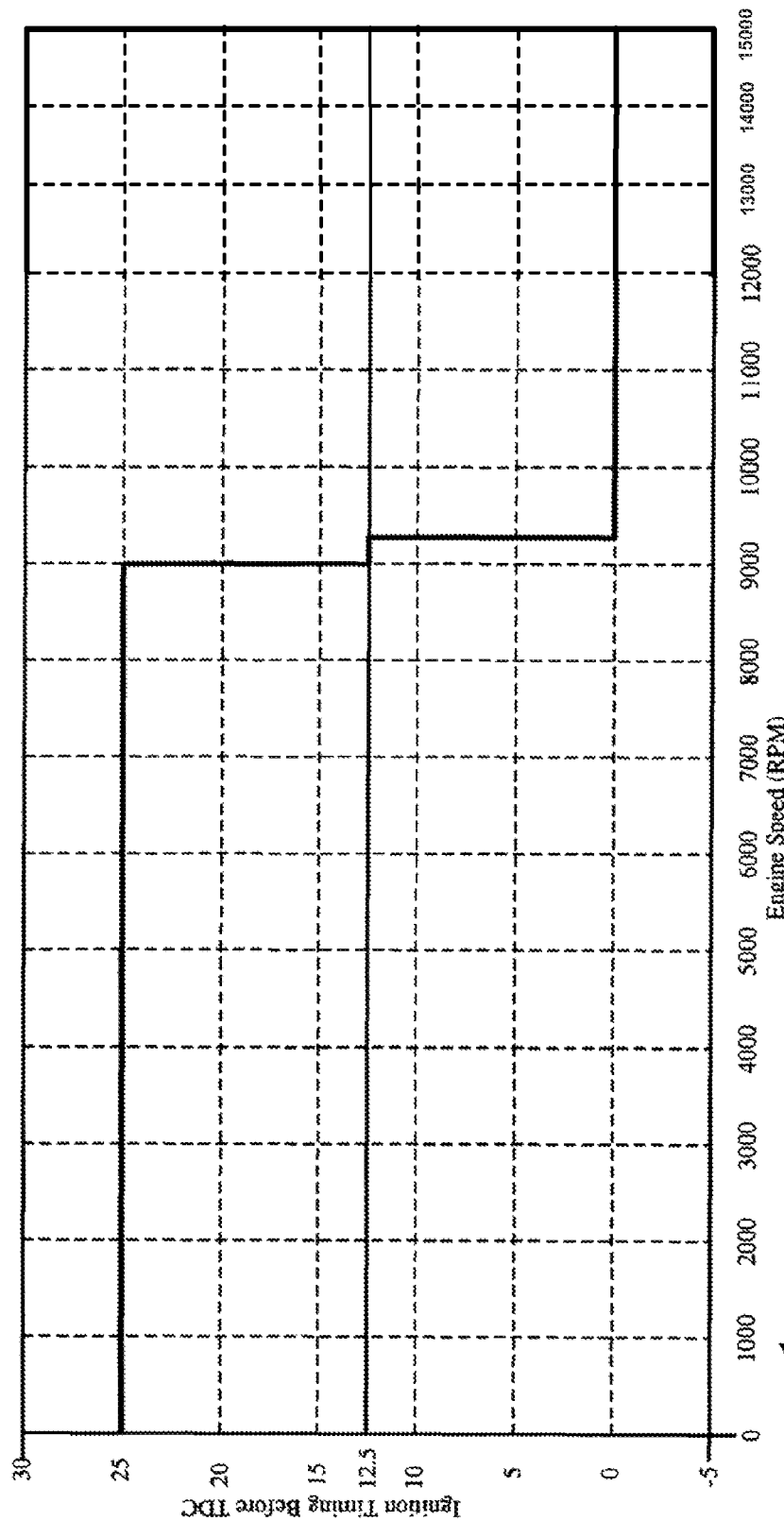
FIG. 2 illustrates an exemplary plot between the ignition timing and engine speed, according to an embodiment of the present invention.

FIG. 2 illustrates an exemplary plot 200 between the ignition timing and engine speed, according to an embodiment of the present invention. Referring to the plot 200, the engine speed may be in a range of 0 RPM to about 12000 RPM and the threshold engine speed may be about 8000 RPM. As illustrated by a solid line in the plot 200, in case of a cold engine the control unit 100 may alternate the ignition timing between about 25 degrees before TDC position and 12.5 degrees before TDC position. As illustrated in FIG. 2, when the engine speed is equal to about 9000 RPM, the ignition timing step-wise retarded from 25 degrees to 12.5 degrees before TDC position. Further, in case of a warm engine, the control unit 100 may alternate the ignition timing between about 12.5 degrees BTDC position and 0 degree before TDC position.

According to another embodiment of the invention, the control unit 100 may alternate the ignition timing between about 31 degrees before TDC position and 10 degrees before TDC position in case of a cold engine, whereas it may alternate the ignition timing between 10 degrees before TDC and 0 degrees before TDC in case of a warm engine.

The number of steps in which the ignition timing is retarded may also be more than two, such that the ignition angle-speed-graph shown in FIG. 2 would have more steps.

The maximum engine speed may vary. For other possible embodiments of the invention, the maximum engine speed may e.g. be 15000 RPM.

The threshold engine speed and the engine speed(s) for which the ignition timing is retarded may vary depending on the characteristics of the engine.

In an embodiment of the present invention, the ignition timing of the engine may alternate between one or more alternation spans. Further, for some revolutions of the engine the ignition timing may be the first ignition timing in the alternation span, and for other revolutions the second ignition timing in the alternation span. For example, but not limiting to, in case of the warm engine the ignition timing may be about 12.5 degrees for every two or three revolutions of the engine and 0 degrees for other revolutions.

It would of course be possible to have more than two alternation spans, such that the ignition angle-speed-graph shown in FIG. 2 would have more steps.

In the case where two alternation spans are used, i.e. when the graph has the appearance shown in FIG. 2, appropriate values for the different ignition timings used may be found within the following timing intervals:

The first ignition timing in the first alternation span may preferably be selected from the interval ranging from 20 to 40 degrees before the TDC position.

The second ignition timing in the second alternation span (for higher engine speeds) may preferably be selected from the interval ranging from 5 degrees after the TDC position to 25 degrees before TDC.

The second ignition timing in the first alternation span, which will be equal to the first ignition timing in the second alternation span may be selected from the resulting interval between the selected first ignition timing in the first interval and the second ignition timing in the second interval.

In various other embodiments of the present invention, the engine may utilize a mechanical ignition system to control the ignition timing of the engine. The mechanical ignition system may use a spark distributor to distribute a high voltage current to the spark plug 108. The spark distributor of the mechanical ignition system may be adjusted to alternate the ignition timing in the step-wise mode. In an embodiment of the present invention, the spark distributor may use weights and springs provided inside the spark distributor to control the ignition timing according to the engine speed. In yet another embodiment of the present invention, engine manifold pressure and temperature sensors may be used in addition to the mechanical spark distributor to control the ignition timing.

Herein, the present invention is explained with reference to a specific embodiment. Though the embodiments of the present invention have been described with reference to specific hardware and software components, those skilled in the art will appreciate that different combinations of hardware and/or software components may also be used, and that particular operations described as being implemented in hardware might also be implemented in software or vice versa. Other embodiments will be evident to those ordinary skilled in the art.

Figure 3:
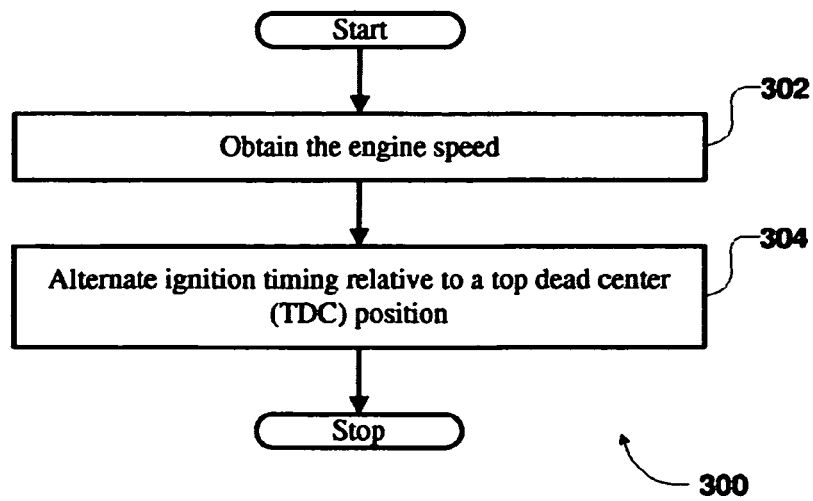
FIG. 3 illustrates an example method for regulating engine speed, according to an embodiment of the present invention.

FIG. 3 illustrates a method 300 summarizing various steps involved in an example embodiment of the present invention. The memory means 106 of the control unit 100 may include computer program instructions or software for performing the steps of method 300. The computer program instructions may include computer readable instructions for obtaining and storing the engine speed and determining the ignition timing corresponding to the obtained engine speed.

In step 302, the engine speed may be obtained by using the speed sensor 102. The speed sensor 102 may use an optical or a contact type sensor arrangement to obtain the engine speed. In step 304, the ignition timing of the engine is alternated in the step-wise mode relative to the TDC position. The engine speed obtained at step 302 may be used to determine an alternating span of the ignition timing relative to the TDC position.

In an embodiment of the present invention, the method 300 may provide regulation of the engine speed by alternating the ignition timing relative to the TDC position in the step-wise mode, when the obtained engine speed increases above the threshold engine speed. In an embodiment of the present invention, the threshold speed of the engine may be set at 8000 RPM. Within an alternation span, the ignition timing may alternate between a first ignition timing and a second ignition timing.

In the drawings and specification, there have been disclosed preferred embodiments and examples of the invention and, although specific terms are employed, they are used in a generic and descriptive sense only and not for the purpose of limitation, the scope of the invention being set forth in the following claims.

The invention claimed is:

1. An arrangement for regulating a speed of a two-stroke combustion engine comprising:
   means for alternating an ignition timing relative to a top dead center position of the two-stroke combustion engine;
   wherein the means for alternating the ignition timing is provided to control the ignition timing such that the ignition timing is step-wise adjustable in response to an engine speed, and
   wherein the ignition timing is step-wise retarded in two or more steps, when the engine speed is higher than a threshold engine speed.

2. The arrangement according to claim 1, wherein the ignition timing is step-wise adjustable in one or more alternating spans.

3. The arrangement according to claim 1, wherein the ignition timing is step-wise adjustable between a first ignition timing and a second ignition timing.

4. The arrangement according to claim 1, wherein, for a cold engine, the ignition timing is step-wise adjustable between about 31 degrees before the top dead center position and about 10 degrees before the top dead center position.

5. The arrangement according to claim 1, wherein, for a warm engine, the ignition timing is step-wise adjustable between about 10 degrees before the top dead center position and about 0 degree before the top dead center position.

6. The arrangement according to claim 1, wherein the threshold speed of the engine is 6000-14500 rpm.

7. The arrangement according to claim 1, wherein the engine speed varies from 0 rpm and 15000 rpm.

8. The arrangement according to claim 1, wherein the ignition is skipped for one or more revolutions of a crankshaft.

9. The arrangement according to claim 1, wherein the engine is operable at same ignition timing for more than one revolutions of a crankshaft.

10. A method for regulating a speed of a two-stroke combustion engine, the method comprising:
obtaining engine speed; and
alternating an ignition timing of the engine relative to a top dead center position, wherein alternating the ignition timing comprises step-wise adjusting the ignition timing in response to the obtained engine speed, wherein alternating the ignition timing comprises comparing the engine speed with a threshold engine speed, and retarding the ignition in two or more steps, if the engine speed is higher than the threshold engine speed.

11. The method according to claim 10, wherein alternating the ignition timing comprises step-wise adjusting the ignition timing between one or more alternating spans.

12. The method according to claim 10, wherein alternating the ignition timing comprises step-wise adjusting the ignition timing between a first ignition timing and a second ignition timing.

13. The method according to claim 10, wherein, for a cold engine, alternating the ignition timing comprises step-wise adjusting the ignition timing between about 31 degrees before the top dead center position and about 10 degrees before the top dead center position.

14. The method according to claim 10, wherein, for a warm engine, alternating the ignition timing comprises step-wise adjusting the ignition timing between about 10 degrees before the top dead center position and 0 degree before the top dead center position.

15. The method according to claim 10, further comprises operating the two-stroke combustion engine between 0 rpm and 15000 rpm.

16. The method according to claim 10, further comprises skipping the ignition for one or more revolutions of a crankshaft.

17. The method according to claim 10, wherein the engine is operable at same ignition timing for more than one revolutions of a crankshaft.

* * * * *